US012720512B2

(12) United States Patent
Baxley

(10) Patent No.: US 12,720,512 B2
(45) Date of Patent: Aug. 25, 2026

(54) DYNAMIC SPECTRUM EXCHANGE FOR ALLOCATION OF SPECTRUM BETWEEN NETWORK NODES

(71) Applicant: Xtremis, Inc., Washington, DC (US)

(72) Inventor: Robert John Baxley, Atlanta, GA (US)

(73) Assignee: Xtremis, Inc., Washington, DC (US)

( * ) Notice: Subject to any disclaimer, the term of this patent is extended or adjusted under 35 U.S.C. 154(b) by 341 days.

(21) Appl. No.: 18/304,043

(22) Filed: Apr. 20, 2023

(65) Prior Publication Data

US 2023/0345441 A1 Oct. 26, 2023

Related U.S. Application Data

(60) Provisional application No. 63/332,960, filed on Apr. 20, 2022.

(51) Int. Cl.

*H04W 72/0453* (2023.01)
*H04W 16/14* (2009.01)
*H04W 72/563* (2023.01)

(52) U.S. Cl.

CPC ....... *H04W 72/0453* (2013.01); *H04W 16/14* (2013.01); *H04W 72/563* (2023.01)

(58) Field of Classification Search

CPC ........... H04W 72/0453; H04W 72/563; H04W 16/14

See application file for complete search history.

(56) References Cited

U.S. PATENT DOCUMENTS 10,873,861 B2 * 12/2020 Furuichi ............... H04W 92/24
11,690,069 B2 * 6/2023 Sharma ............. H04W 72/0453 370/329
11,711,862 B1 * 7/2023 Patel ..................... H04W 76/15 370/329
2014/0016494 A1 * 1/2014 Van Phan ............ H04W 24/08 370/252
2016/0219504 A1 * 7/2016 Cho .................... H04W 52/242
2019/0200247 A1 * 6/2019 Wang ...................... H04W 8/20
2021/0068077 A1 * 3/2021 Raghavan ............ H04B 7/0404
2021/0176674 A1 * 6/2021 Jung ..................... H04W 36/04
2021/0185699 A1 * 6/2021 Alasti ................... H04L 5/0064
2021/0212044 A1 * 7/2021 Ryu ...................... H04W 28/26
2022/0217623 A1 * 7/2022 Sevindik ................. H04W 8/04

FOREIGN PATENT DOCUMENTS

EP 2437532 A1 * 4/2012 ........... H04W 16/06

* cited by examiner

*Primary Examiner* — Mounir Moutaouakil
(74) *Attorney, Agent, or Firm* — Goodwin Procter LLP

(57) ABSTRACT

An example spectrum exchange, a computer-implemented method, and a non-transitory computer-readable storage medium are provided. In some embodiments, the computer-implemented method may include receiving an interface language message from a network node. In some embodiments, the interface language message comprises a spectrum allocation request. In some embodiments, the computer-implemented method may include determining a spectrum allocation for the network node based at least in part on the spectrum allocation request and spectrum priority data. In some embodiments, the computer-implemented method may include transmitting the spectrum allocation to the network node.

20 Claims, 8 Drawing Sheets

DYNAMIC SPECTRUM EXCHANGE FOR ALLOCATION OF SPECTRUM BETWEEN NETWORK NODES

CROSS REFERENCE TO RELATED APPLICATIONS

This application claims the benefit of priority to U.S. Provisional Application Ser. No. 63/332,960, filed on Apr. 20, 2022, which is incorporated herein by reference in its entirety.

FIELD

Embodiments of the present disclosure relate generally to spectrum exchanges.

BACKGROUND

Applicant has identified many technical challenges and difficulties associated with spectrum exchanges. Through applied effort, ingenuity, and innovation, Applicant has solved problems related to spectrum exchanges by developing solutions embodied in the present disclosure, which are described in detail below.

BRIEF SUMMARY

Various embodiments described herein relate to spectrum exchanges.

In accordance with one aspect of the disclosure, a spectrum exchange is provided is provided. In some embodiments, the spectrum exchange may include at least one processor and at least one memory coupled to the at least one processor. In some embodiments, the at least one processor may be configured to receive an interface language message from a network node. In some embodiments, the interface language message comprises a spectrum allocation request. In some embodiments, the at least one processor may be configured to determine a spectrum allocation for the network node based at least in part on the spectrum allocation request and spectrum priority data. In some embodiments, the at least one processor may be configured to transmit the spectrum allocation to the network node.

In some embodiments, the network node has been instructed to use a frequency band by a spectrum access coordinator.

In some embodiments, the spectrum allocation indicates an amount of spectrum in the frequency band allocated to the network node.

In some embodiments, the spectrum allocation is associated with a spectrum allocation size.

In some embodiments, at least a portion of the spectrum priority data is received from the network node.

In some embodiments, the spectrum allocation request comprises a request for spectrum that occupies a portion of a network node specified frequency band.

In some embodiments, the network node comprises a base station, or a virtual machine.

In some embodiments, the virtual machine is a software defined radio.

In some embodiments, the spectrum priority data comprises one or more of latency data, network node priority data, modulation coding scheme data, network node position data, propagation model data, token data, spectrum allocation size data, radiation data, transmitter data, sensing data, or other spectrum allocation data.

In some embodiments, the network node is configured to allocate at least a portion of the spectrum allocation to a user device associated with the network node.

In some embodiments, the network node is at least one of a first priority network node, a second network node, or a third priority network node.

In accordance with another aspect of the disclosure, a computer-implemented method is provided. In some embodiments, the computer-implemented method may include receiving an interface language message from a network node. In some embodiments, the interface language message comprises a spectrum allocation request. In some embodiments, the computer-implemented method may include determining a spectrum allocation for the network node based at least in part on the spectrum allocation request and spectrum priority data. In some embodiments, the computer-implemented method may include transmitting the spectrum allocation to the network node.

In some embodiments, the network node has been instructed to use a frequency band by a spectrum access coordinator.

In some embodiments, the spectrum allocation indicates an amount of spectrum in the frequency band allocated to the network node.

In some embodiments, the spectrum allocation is associated with a spectrum allocation size.

In some embodiments, at least a portion of the spectrum priority data is received from the network node.

In some embodiments, the spectrum allocation request comprises a request for spectrum that occupies a portion of a network node specified frequency band.

In some embodiments, the network node comprises a base station, or a virtual machine.

In some embodiments, the virtual machine is a software defined radio.

In some embodiments, the spectrum priority data comprises one or more of latency data, network node priority data, modulation coding scheme data, network node position data, propagation model data, token data, spectrum allocation size data, radiation data, transmitter data, sensing data, or other spectrum allocation data.

In some embodiments, the network node is configured to allocate at least a portion of the spectrum allocation to a user device associated with the network node.

In some embodiments, the network node is at least one of a first priority network node, a second network node, or a third priority network node.

In accordance with another aspect of the disclosure, a non-transitory computer-readable storage medium is provided. In some embodiments, the computer-readable medium may include computer program code for execution by one or more processors of a device. In some embodiments, the computer program code may be configured to, when executed by the one or more processors, cause the device to receive an interface language message from a network node. In some embodiments, the interface language message comprises a spectrum allocation request. In some embodiments, the computer program code may be configured to, when executed by the one or more processors, cause the device to determine a spectrum allocation for the network node based at least in part on the spectrum allocation request and spectrum priority data. In some embodiments, the computer program code may be configured to, when executed by the one or more processors, cause the device to transmit the spectrum allocation to the network node.

In some embodiments, the network node has been instructed to use a frequency band by a spectrum access coordinator.

In some embodiments, the spectrum allocation indicates an amount of spectrum in the frequency band allocated to the network node.

In some embodiments, the spectrum allocation is associated with a spectrum allocation size.

In some embodiments, at least a portion of the spectrum priority data is received from the network node.

In some embodiments, the spectrum allocation request comprises a request for spectrum that occupies a portion of a network node specified frequency band.

In some embodiments, the network node comprises a base station, or a virtual machine.

In some embodiments, the virtual machine is a software defined radio.

In some embodiments, the spectrum priority data comprises one or more of latency data, network node priority data, modulation coding scheme data, network node position data, propagation model data, token data, spectrum allocation size data, radiation data, transmitter data, sensing data, or other spectrum allocation data.

In some embodiments, the network node is configured to allocate at least a portion of the spectrum allocation to a user device associated with the network node.

In some embodiments, the network node is at least one of a first priority network node, a second network node, or a third priority network node.

In accordance with one aspect of the disclosure, a spectrum exchange is provided. In some embodiments, the spectrum exchange may include at least one processor and at least one memory coupled to the at least one processor. In some embodiments, the at least one processor may be configured to receive a spectrum allocation request from a radio gateway. In some embodiments, the at least one processor may be configured to receive a spectrum allocation request from a radio gateway. In some embodiments, the at least one processor may be configured to route the spectrum allocation request to a first spectrum exchange instance of a plurality of spectrum exchange instances. In some embodiments, routing the spectrum allocation request to a first spectrum exchange instance is performed by a load engine. In some embodiments, the first spectrum exchange instance of the plurality of spectrum exchange instances is configured to determine a spectrum allocation based at least in part on the spectrum allocation request. In some embodiments, the spectrum allocation is based at least in part on the spectrum allocation request. In some embodiments, the at least one processor may be configured to transmit the spectrum allocation request and the spectrum allocation to a blockchain.

In some embodiments, the blockchain is an Ethereum Virtual Machine based blockchain.

In some embodiments, the Ethereum Virtual Machine based blockchain is a public Ethereum Virtual Machine based blockchain.

In some embodiments, the Ethereum Virtual Machine based blockchain is a private Ethereum Virtual Machine based blockchain.

In some embodiments, the at least one processor may be configured to determine that the first spectrum exchange instance of the plurality of spectrum exchange instances is affected by a fault.

In some embodiments, the at least one processor may be configured to receive a second spectrum allocation request.

In some embodiments, the at least one processor may be configured to route the second spectrum allocation request to a second spectrum exchange instance of a plurality of spectrum exchange instances based at least in part on the determination that the first spectrum exchange instance of the plurality of spectrum exchange instances is affected by the fault.

In some embodiments, the at least one processor may be configured to access the spectrum allocation request or the spectrum allocation from the blockchain when the first spectrum exchange instance of the plurality of spectrum exchange instances is affected by a fault.

In some embodiments, the fault comprises the first spectrum exchange instance of the plurality of spectrum exchange instances being offline.

In some embodiments, the at least one processor may be configured to perform a security scan on at least on at least one of the plurality of spectrum exchange instances.

In some embodiments, the at least one processor may be configured to cause the spectrum allocation request and the spectrum allocation to be displayed on a user interface.

In some embodiments, the spectrum allocation comprises a spectrum of approximately 100 kilohertz.

In accordance with another aspect of the disclosure, a computer-implemented method is provided. In some embodiments, the computer-implemented method may include receiving a spectrum allocation request from a radio gateway. In some embodiments, the computer-implemented method may include routing the spectrum allocation request to a first spectrum exchange instance of a plurality of spectrum exchange instances. In some embodiments, routing the spectrum allocation request to a first spectrum exchange instance is performed by a load engine. In some embodiments, the first spectrum exchange instance of the plurality of spectrum exchange instances is configured to determine a spectrum allocation based at least in part on the spectrum allocation request. In some embodiments, the spectrum allocation is based at least in part on the spectrum allocation request. In some embodiments, the computer-implemented method may include transmitting the spectrum allocation request and the spectrum allocation to a blockchain.

In some embodiments, the blockchain is an Ethereum Virtual Machine based blockchain.

In some embodiments, the Ethereum Virtual Machine based blockchain is a public Ethereum Virtual Machine based blockchain.

In some embodiments, the Ethereum Virtual Machine based blockchain is a private Ethereum Virtual Machine based blockchain.

In some embodiments, the computer-implemented method may include determining that the first spectrum exchange instance of the plurality of spectrum exchange instances is affected by a fault.

In some embodiments, the computer-implemented method may include receiving a second spectrum allocation request.

In some embodiments, the computer-implemented method may include routing the second spectrum allocation request to a second spectrum exchange instance of a plurality of spectrum exchange instances based at least in part on the determination that the first spectrum exchange instance of the plurality of spectrum exchange instances is affected by the fault.

In some embodiments, the computer-implemented method may include accessing the spectrum allocation request or the spectrum allocation from the blockchain when the first spectrum exchange instance of the plurality of spectrum exchange instances is affected by a fault.

In some embodiments, the fault comprises the first spectrum exchange instance of the plurality of spectrum exchange instances being offline.

In some embodiments, the computer-implemented method may include performing security scan on at least on at least one of the plurality of spectrum exchange instances.

In some embodiments, the computer-implemented method may include causing the spectrum allocation request and the spectrum allocation to be displayed on a user interface.

In some embodiments, the spectrum allocation comprises a spectrum of approximately 100 kilohertz.

In accordance with another aspect of the disclosure, a non-transitory computer-readable storage medium is provided. In some embodiments, the computer-readable medium may include computer program code for execution by one or more processors of a device. In some embodiments, the computer program code may be configured to, when executed by the one or more processors, cause the device to receive a spectrum allocation request from a radio gateway. In some embodiments, the computer program code may be configured to, when executed by the one or more processors, cause the device to receive a spectrum allocation request from a radio gateway. In some embodiments, the computer program code may be configured to, when executed by the one or more processors, cause the device to route the spectrum allocation request to a first spectrum exchange instance of a plurality of spectrum exchange instances. In some embodiments, routing the spectrum allocation request to a first spectrum exchange instance is performed by a load engine. In some embodiments, the first spectrum exchange instance of the plurality of spectrum exchange instances is configured to determine a spectrum allocation based at least in part on the spectrum allocation request. In some embodiments, the spectrum allocation is based at least in part on the spectrum allocation request. In some embodiments, the computer program code may be configured to, when executed by the one or more processors, cause the device to transmit the spectrum allocation request and the spectrum allocation to a blockchain.

In some embodiments, the blockchain is an Ethereum Virtual Machine based blockchain.

In some embodiments, the Ethereum Virtual Machine based blockchain is a public Ethereum Virtual Machine based blockchain.

In some embodiments, the Ethereum Virtual Machine based blockchain is a private Ethereum Virtual Machine based blockchain.

In some embodiments, the computer program code may be configured to, when executed by the one or more processors, cause the device to determine that the first spectrum exchange instance of the plurality of spectrum exchange instances is affected by a fault.

In some embodiments, the computer program code may be configured to, when executed by the one or more processors, cause the device to receive a second spectrum allocation request.

In some embodiments, the computer program code may be configured to, when executed by the one or more processors, cause the device to route the second spectrum allocation request to a second spectrum exchange instance of a plurality of spectrum exchange instances based at least in part on the determination that the first spectrum exchange instance of the plurality of spectrum exchange instances is affected by the fault.

In some embodiments, the computer program code may be configured to, when executed by the one or more processors, cause the device to access the spectrum allocation request or the spectrum allocation from the blockchain when the first spectrum exchange instance of the plurality of spectrum exchange instances is affected by a fault.

In some embodiments, the fault comprises the first spectrum exchange instance of the plurality of spectrum exchange instances being offline.

In some embodiments, the computer program code may be configured to, when executed by the one or more processors, cause the device to perform a security scan on at least on at least one of the plurality of spectrum exchange instances.

In some embodiments, the computer program code may be configured to, when executed by the one or more processors, cause the device to cause the spectrum allocation request and the spectrum allocation to be displayed on a user interface.

In some embodiments, the spectrum allocation comprises a spectrum of approximately 100 kilohertz.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
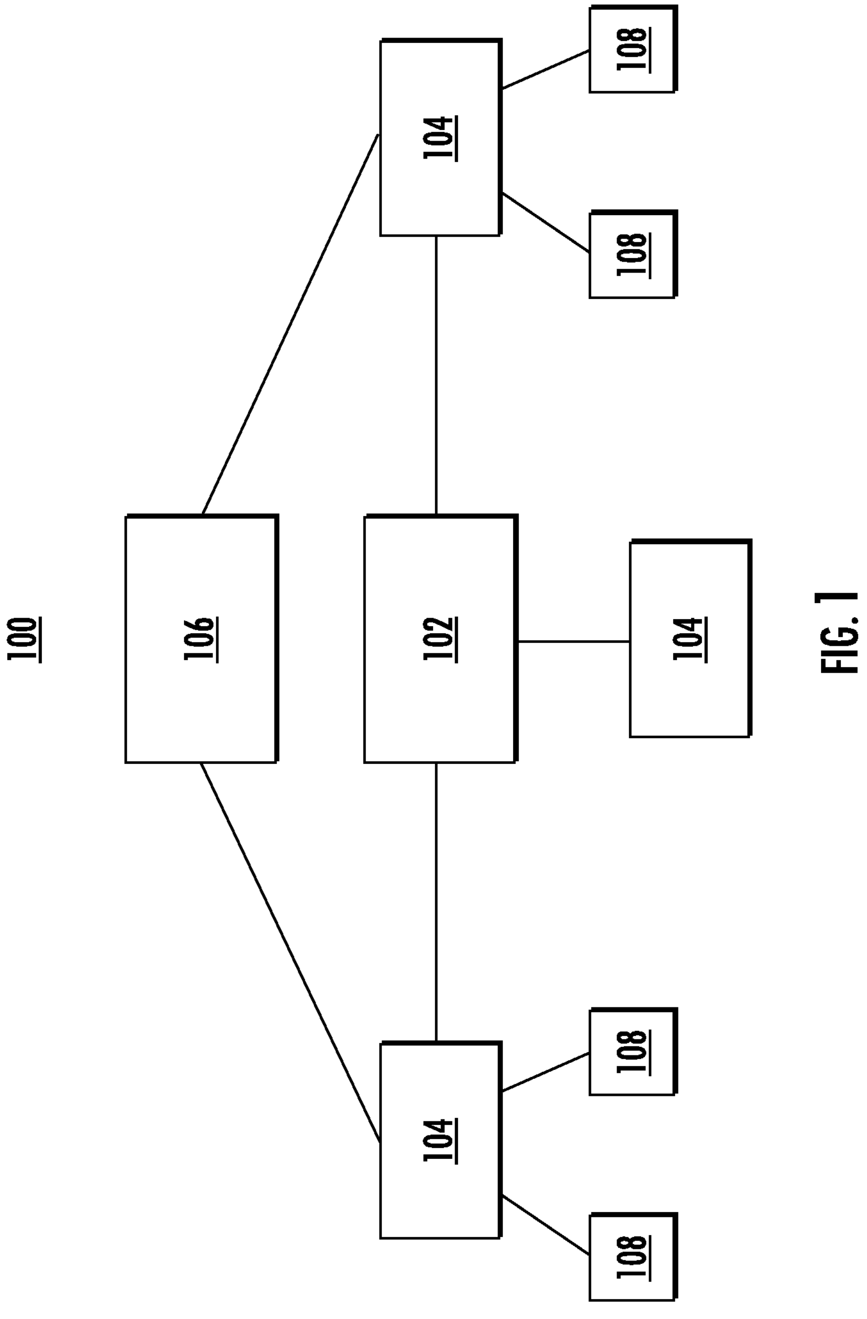
FIG. 1 illustrates an environment in which one or more embodiments of the present disclosure may operate.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with spectrum exchanges. As would be understood by one skilled in the field to which this disclosure pertains, there are numerous example scenarios in which a user may use a spectrum exchange.

In many applications (e.g., 5G), spectrum is allocated to network nodes (e.g., base stations) and/or radio gateways (e.g., Wi-Fi routers). For example, a 10 MHz frequency band from 3550 to 3560 MHz for 5 minutes to a first network node and/or a first radio gateway and a 10 MHz frequency band from 3560 MHz to 3570 MHz for 5 minutes to a second network node and/or a second radio gateway.

An example solution for allocating spectrum to network nodes includes a spectrum access coordinator being configured to instruct network nodes to use particular frequency bands (e.g., spectrum allocations) for a particular amount of time. However, such an example solution is unable to allocate spectrum at a fine frequency and/or time scale (e.g., a spectrum access coordinator is unable to allocate spectrum to network nodes in a frequency band narrower than 10 MHz and/or for a time period less than 5 minutes). Additionally, such an example solution does not contemplate the sharing of spectrum between network nodes that has been previously allocated to the network nodes. For example, a first network node and a second network node may each have been allocated 10 MHz. The first network node is only using 5 MHz of the allocated 10 MHZ while the second network node is using all 10 MHz and has demand for more spectrum. However, such an example solution is unable to facilitate the sharing of spectrum between the first network node and the second network node (e.g., the first network node sharing some of its allocated spectrum with the second network node). Accordingly, there is a need for systems, apparatuses, and methods that enable for the sharing of spectrum between network nodes at fine frequency and/or time scales (e.g., frequency narrower than 10 MHz and time scales less than 5 minutes).

Thus, to address these and/or other issues a spectrum exchange is disclosed herein. For example, an embodiment in this disclosure, described in greater detail below, includes a spectrum exchange configured to receive an interface language message from a network node. In some embodiments, the interface language message includes a spectrum allocation request and spectrum priority data. In some embodiments, the spectrum exchange is configured to determine a spectrum allocation for the network node based at least in part on the spectrum allocation request and the spectrum priority data. In some embodiments, a spectrum allocation size may be less than 10 MHz by 5 minutes. In some embodiments, the spectrum exchange may be configured to transmit the spectrum allocation to the network node. Accordingly, a spectrum exchange disclosed herein may be configured to facilitate the sharing of spectrum between network nodes at fine frequency and/or time scales (e.g., share spectrum at a size of less than 10 MHz by 5 minutes).

An example solution for allocating spectrum to network nodes includes allocating spectrum between radio gateways via an intermediary (e.g., the intermediary facilitates the sharing of frequency bands between radio gateways). However, such an example solution does not contemplate how to allocate spectrum between radio gateways if the intermediary is affected by a fault. For example, if the intermediary is affected by a fault that causes the intermediary to go offline, it is not possible to share spectrum between radio gateways. Additionally, in such an example solution, if the intermediary goes offline, it is not possible to determine previous spectrum allocations and/or previous spectrum allocation requests. As a result, even when the intermediary is no longer affected by the fault, it may be difficult to allocate spectrum between radio gateways without causing conflicts with previous spectrum allocations.

Thus, to address these and/or other issues a spectrum exchange is disclosed herein. For example, an embodiment in this disclosure, described in greater detail below, includes a spectrum exchange configured to receive a spectrum allocation request from a radio gateway. In some embodiments, the spectrum exchange is configured to route the spectrum allocation request to a first spectrum exchange instance of a plurality of spectrum exchange instances. In some embodiments, routing the spectrum allocation request to a first spectrum exchange instance is performed by a load engine. In some embodiments, the first spectrum exchange instance of the plurality of spectrum exchange instances is configured to determine a spectrum allocation based at least in part on the spectrum allocation request. In some embodiments, the spectrum exchange is configured to transmit the spectrum allocation request and the spectrum allocation to a blockchain. Accordingly, a spectrum exchange disclosed herein may be configured to be able to able to allocate spectrum to one or more radio gateways even if a spectrum exchange instance is affected by a fault (e.g., by using a spectrum exchange instance of the plurality of spectrum exchange instances that is not affected by a fault when the first spectrum exchange instance is affected by a fault) and/or able to access previous spectrum allocations and/or spectrum allocation requests even when a spectrum exchange instance is affected by a fault (e.g., by referring to the blockchain).

Example Spectrum Exchange

Figure 2:
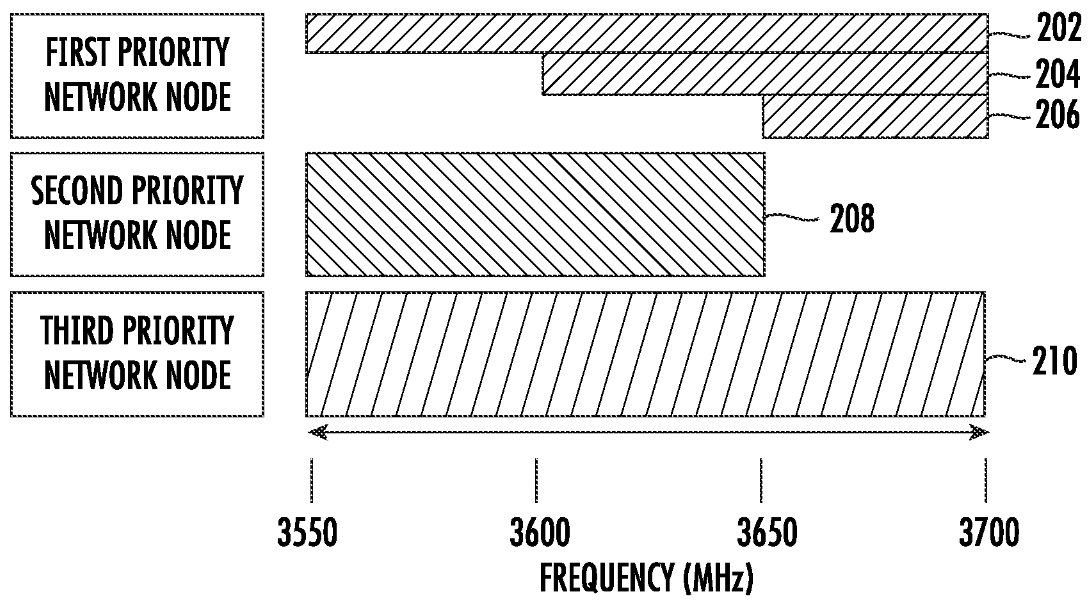
FIG. 2 illustrates an example graph in accordance with one or more embodiments of the present disclosure.
Figure 3:
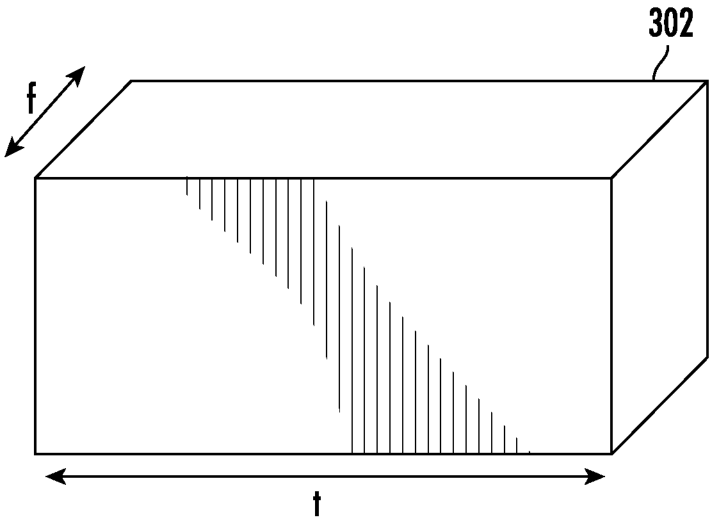
FIG. 3 illustrates a perspective view of an example spectrum allocation in accordance with one or more embodiments of the present disclosure.

With reference to FIGS. 1-3, embodiments herein provide for an example spectrum exchange. FIG. 1 illustrates an exemplary block diagram of an environment 100 in which embodiments of the present disclosure may operate. Specifically, FIG. 1 illustrates a spectrum exchange 102. For example, the spectrum exchange 102 may be a zylinium spectrum exchange (ZSE). In some embodiments, the spectrum exchange 102 may be configured to facilitate sharing of radio frequency spectrum, such as spectrum associated with 5G, long term evolution (LTE), Wi-Fi, Bluetooth, and/or the like.

In some embodiments, the environment 100 may include one or more network nodes 104 in communication with the spectrum exchange 102. In some embodiments, the one or more network nodes 104 may include a base station. For example, the base station may be a cellular tower (e.g., a gNodeB). Additionally or alternatively, the one or more network nodes 104 may include a virtual machine. For example, the virtual machine may be a software defined radio. Additionally or alternatively, the one or more network nodes 104 may include a domain proxy. Additionally or alternatively, the one or more network nodes 104 may include a Wi-Fi router. Additionally or alternatively, the one or more network nodes 104 may be a user device. For example, the user device may be a citizens broadband radio service device (CBSD), a cellular phone, a smart phone, a communication device, a tablet computing device, a laptop computing device, a desktop computing device, a mobile computing device, any combination thereof, and/or the like. Said differently, in some embodiments, the one or more network nodes 104 may include any device capable of transmitting and/or receiving radio frequency signals.

In some embodiments, each of the one or more network nodes 104 may be instructed to use a frequency band and/or when in time to use the frequency band by a spectrum access coordinator 106 (e.g., the spectrum access coordinator 106 may be configured to allocate spectrum to the one or more network nodes 104). In some embodiments, the spectrum access coordinator 106 may be configured to instruct each of the one or more network nodes 104 to use any radio frequency band. For example, in some embodiments, the spectrum access coordinator 106 may be configured to instruct each of the one or more network nodes 104 to use a frequency band in the citizens broadband radio service (CBRS) band (e.g., the CBRS band from 3550 Megahertz (MHz) to 3700 MHz) for a particular amount of time. For example, the spectrum access coordinator 106 may be configured to instruct the one or more network nodes 104 to use a 10 MHz frequency band in the CBRS band (e.g., 3550 Megahertz (MHz) to 3560 MHz) for 10 minutes. In some embodiments, when instructing the one or more network nodes 104 to use a frequency band in the CBRS band, the spectrum access coordinator 106 may be referred to as a spectrum access system (SAS). As another example, in some embodiments, the spectrum access coordinator 106 may be configured to instruct each of the one or more network nodes 104 to use a frequency band in one of the industrial, scientific, and medical (ISM) bands, such as the 2.4 Gigahertz (GHz) ISM band for a particular amount of time. For example, the spectrum access coordinator 106 may be configured to instruct the one or more network nodes 104 to use a 5 MHz frequency band in the 2.4 GHz ISM band for 10 minutes. In some embodiments, the one or more network nodes 104 and the spectrum access coordinator 106 may communicate with each other using the HTTPS RESTful API.

In some embodiments, each of the one or more network nodes 104 may be at least one of a first priority network node, a second priority network node, or a third priority network node. In some embodiments, the spectrum access coordinator 106 may be configured to instruct the one or more network nodes 104 to use a frequency band and/or when in time to use the frequency band based at least in part on whether a network node in the one or more network nodes 104 is a first priority network node, a second priority network node, or a third priority network node. In this regard, for example, a first priority network node may receive priority over a third priority network node in access to particular frequency bands and time when particular frequency bands may be used.

In some embodiments, such as when the one or more network nodes 104 are using a frequency band in the CBRS band, a first priority network node may be an incumbent network node, a second priority network node may be a priority access licenses (PAL) network node, and a third priority network node may be a general authorized access (GAL) network node. In some embodiments, an incumbent network node may receive priority over a PAL network node and/or a GAL network node. In some embodiments, an incumbent network node may include military radar 202 (e.g., navy radar) with access from 3550 MHz to 3700 MHz. Additionally or alternatively, an incumbent network node may include fixed satellite service 204 with access from 3600 MHz to 3700 MHz. Additionally or alternatively, an incumbent network node may include wireless internet service providers 206 (ISP) (e.g., wireless ISP that have been grandfathered in to being an incumbent network node). In some embodiments, a PAL network node may receive priority over a GAL network node. In some embodiments, a PAL network node 208 may have access from 3550 MHz to 3650 MHz (e.g., access when the spectrum is not being used by an incumbent network node). In some embodiments, a GAA network node may not have priority over an incumbent network node or a PAL network node. In some embodiments, a GAA network node 210 may have access from 3550 MHz to 3700 MHz (e.g., access when the spectrum is not being used by an incumbent network node or a PAL network node).

In some embodiments, the spectrum exchange 102 may be configured to facilitate the sharing of spectrum between the one or more network nodes 104 in communication with the spectrum exchange 102. Said differently, the spectrum exchange 102 may be configured to facilitate the sharing of spectrum that has been allocated to one of the one or more network nodes 104 by the spectrum access coordinator 106 with another one of the one or more network nodes 104. For example, if a first network node and a second network node of the one or more network nodes 104 have each been instructed by the spectrum access coordinator 106 to use a 10 MHz frequency band in the CBRS band (e.g., 3550 Megahertz (MHz) to 3560 MHz and 3560 Megahertz (MHz) to 3570 MHz, respectively) for 10 minutes, the spectrum exchange 102 may be configured to facilitate the second network node sharing a portion of 10 MHz frequency band allocated to it by the spectrum access coordinator 106 with the first network node of the one or more network nodes 104 for a particular amount of time.

In some embodiments, the spectrum exchange 102 may be configured to facilitate the sharing of spectrum between the one or more network nodes 104 at a more granular scale that than the scale that the spectrum access coordinator 106 allocates spectrum to the one or more network nodes 104 (e.g., at more granular spectrum voxels). In this regard, for example, the spectrum exchange 102 may be configured to facilitate the sharing of spectrum between the one or more network nodes 104 at a size that is less than 10 MHz by 5 minutes. For example, the spectrum exchange 102 may be configured to facilitate the sharing of spectrum between the one or more network nodes at a resource block scale.

In some embodiments, each spectrum allocation, such as spectrum allocation 302, may be an amount of spectrum (e.g., a spectrum voxel) that the spectrum exchange 102 allocates to a network node of the one or more network nodes 104. In this regard, for example, each spectrum allocation may be associated with a spectrum allocation size (e.g., the spectrum allocation size indicating an amount of spectrum). The spectrum allocation size may be defined by a frequency (f) and/or a time (t). For example, a spectrum allocation size may be 180 kilohertz by 1 millisecond. In some embodiments, such as when the spectrum allocation is a resource block having a resource block size may include a resource block having 12 sub-carriers with each sub-carrier having a frequency band of 15 kHz and 2 time slots with each time slot having 7 orthogonal frequency-division multiplexing (OFDM) symbols. In this regard, for example, each resource block may be comprised of a plurality of resource elements with each resource element being 1 sub-carrier by 1 OFDM signal.

In some embodiments, each of the one or more network nodes 104 may be in communication with one or more user devices 108. For example, a network node of the one or more network nodes 104 may be in communication with one or more user devices 108 when the network node is a base station, a virtual machine, and/or a domain proxy. In some embodiments, for example, the one or more user devices 108 may be a CBSD (e.g., a user device configured to use the CBRS band). In some embodiments, each of the one or more network nodes 104 may be configured to coordinate spectrum access to user devices of the one or more user devices 108 that each of the one or more network nodes 104 is in communication with. Said differently, in some embodiments, each of the one or more network nodes 104 may be configured to allocate the spectrum received by each network node of the one or more network nodes 104 to the one or more user devices in communication with the network node.

In some embodiments, the spectrum exchange 102 may be configured to receive an interface language message from one or more network nodes 104. In some embodiments, the interface language message may be based at least in part on one or more interface languages, such as the zylinium interface language (ZIL) and/or the collaboration interface language (CIL). In some embodiments, the spectrum exchange 102 may be configured to facilitating the sharing of spectrum between the one or more network nodes 104 based at least in part on an interface language message.

In some embodiments, the interface language message received from a network node of the one or more network nodes 104 by the spectrum exchange 102 may include a spectrum allocation request. The spectrum allocation request may indicate an amount of spectrum that a network node is requesting that the spectrum exchange 102 may allocate to it (e.g., from another network node in the one or more network nodes 104). In some embodiments, the spectrum allocation request may be a request for a particular portion of spectrum. For example, the spectrum allocation request may request 180 kHz for 1 millisecond (e.g., one resource block) from 3550 MHz to 3550.018 MHz. In some embodiments, the spectrum allocation request may be a request for spectrum that occupies a portion of a network node specified frequency band and/or for spectrum for a time period that occupies a portion of a network node specified time frame. For example, the spectrum allocation request be a request for 180 kHz in a frequency band from 3550 MHz to 3600 MHZ (e.g., the network node specified frequency band) for 1 second in the next 10 seconds (e.g., the network node specified time frame).

In some embodiments, the spectrum exchange 102 may be configured to determine a spectrum allocation for a network node of the one or more network nodes 104. In some embodiments, the spectrum allocation may indicate an amount of spectrum in the frequency band allocated to the network node of the one or more network nodes 104. Additionally or alternatively, the spectrum allocation may indicate a location of the spectrum in the frequency band allocated to the network node of the one or more network nodes 104. For example, if the frequency band is in the CBRS band, the spectrum allocation may indicate a spectrum from 3550 MHz to 3550.018 MHz.

In some embodiments, determining the spectrum allocation for a network node may be based at least in part on the spectrum allocation request. For example, if the spectrum allocation request indicates that a network node in the one or more network nodes 104 is requesting 200 kHz for 1 second, the spectrum allocation may be 200 kHz for 1 second. As another example, if the spectrum allocation request indicates that a network node in the one or more network nodes 104 is requesting 200 kHz in a frequency band from 1000 MHz to 1100 MHz for 1 second in the next 10 seconds, the spectrum allocation may be 200 kHz somewhere in the frequency band from 1000 MHz to 1100 MHz for 1 second sometime in the next 10 seconds.

In some embodiments, determining the spectrum allocation for a network node may be based at least in part on spectrum priority data. In some embodiments, determining the spectrum allocation for a network node may include implementing a mixed integer optimization routine based on the spectrum allocation request and/or the spectrum priority data. In some embodiments, at least a portion of the spectrum priority data may be received from the one or more network nodes 104 (e.g., the interface language message includes at least a portion of the spectrum priority data). Additionally or alternatively, the spectrum exchange 102 may be configured to determine at least a portion of the spectrum priority data.

In some embodiments, the spectrum priority data may include latency data. Additionally or alternatively, the spectrum priority data may include traffic priority data. For example, the traffic priority data may indicate the priority of the traffic a network node is transmitting and/or receiving. Additionally or alternatively, the spectrum priority data may include modulation coding scheme data. For example, the modulation coding scheme data may indicate how many useful bits can be transmitted per resource element.

Additionally or alternatively, the spectrum priority data may include network node position data. For example, the network node position data may indicate a location of a network node of the one or more network nodes 104 in a network (e.g., position in the environment 100) and/or a geographic location associated with a network node in the one or more network nodes 104. Additionally or alternatively, the spectrum priority data may include propagation model data. For example, the propagation model data may indicate a propagation model used by a network node in the one or more network nodes 104. In some embodiments, the propagation model used by a network node in the one or more network nodes 104 may be based on a geographic location of the network node (e.g., is the geographic location a mountains location, a flat location, etc.) and/or whether the network node is located indoors (e.g., an indoor Wi-Fi router) or outdoors (e.g., an outdoor cellular tower).

Additionally or alternatively the spectrum priority data may include token data. For example, the token data may indicate whether a network node is using one or more spectrum tokens. In this regard, for example, spectrum tokens may be a currency proxy purchased by a network node to increase the network node's priority in receiving spectrum (e.g., by using spectrum tokens a network node is more likely to receive the amount of spectrum requested by the network node in a spectrum allocation request). Additionally or alternatively, the spectrum priority data may include spectrum allocation size data. For example, the spectrum allocation size data may indicate a standard size of a frequency band used by a network node in the one or more network nodes 104.

Additionally or alternatively, the spectrum priority data may include radiation data. For example, the radiation data may indicate a radiation pattern associated with a network node of the one or more network nodes 104 (e.g., radiation pattern of an antenna associated with a network node). Additionally or alternatively, the spectrum priority data may include transmitter data. For example, the transmitter data may indicate a transmitter height and/or a transmitter motion trajectory associated with a network node of the one or more network nodes 104. Additionally or alternatively, the spectrum priority data may include sensing data. For example, the sensing data may indicate whether there is energy in a particular frequency band (e.g., energy in a particular frequency band may indicate that the frequency band is already in use). Additionally or alternatively, the spectrum priority data may include other spectrum allocation data. For example, the other spectrum allocation data may indicate spectrum that the spectrum exchange 102 has allocated to other network nodes in the one or more network nodes 104 (e.g., network nodes that are not associated with the current spectrum allocation request being processed by the spectrum exchange 102).

In some embodiments, as described above, determining the spectrum allocation for a network node may be based at least in part on the spectrum priority data. For example, if the traffic priority data indicates that a network node in the one or more network nodes 104 is receiving and/or transmitting low priority traffic, the spectrum allocation may be less than the amount of spectrum requested in the spectrum allocation request. As another example, if the other spectrum allocation data indicates that a portion of the spectrum requested by a network node has been allocated to another network node, the spectrum allocation may only include the portion of the spectrum in the spectrum allocation request that has not been allocated (e.g., ensuring that the spectrum allocated to two network nodes in the one or more network nodes 104 does not overlap).

In some embodiments, the spectrum exchange 102 may be configured to transmit the spectrum allocation to the one or more network nodes 104. In this regard, for example, the spectrum exchange 102 may transmit an indication of the amount of spectrum in the frequency band allocated to the network node of the one or more network nodes 104. Additionally or alternatively, for example, the spectrum exchange 102 may transmit an indication of the location of the spectrum in the frequency band allocated to the network node of the one or more network nodes 104.

In some embodiments, the spectrum exchange 102 may be configured to perform development, security, and operations (DevSecOps) for the one or more network nodes 104. For example, the spectrum exchange 102 may be configured to perform DevSecOps for the one or more network nodes 104 when the one or more network nodes 104 are a virtual machine that is a software defined radio. In some embodiments, performing DevSecOps may include the spectrum exchange 102 being configured to determine whether the one or more network nodes 104 are capable of responding to instructions by the spectrum exchange 102 to change spectrum usage. For example, performing DevSecOps may include the spectrum exchange 102 determining whether a network node changes its spectrum usage in response to the spectrum exchange 102 transmitting the spectrum allocation to the network node. In some embodiments, the spectrum exchange 102 may be configured to perform DevSecOps using one or more software defined radio testbeds (e.g., Colosseum, Powder, etc.). In this regard, using one or more software defined radio testbeds enables the spectrum exchange 102 to iteratively perform DevSecOps for all of the network nodes in the one or more network nodes 104.

Example Method

Figure 4:
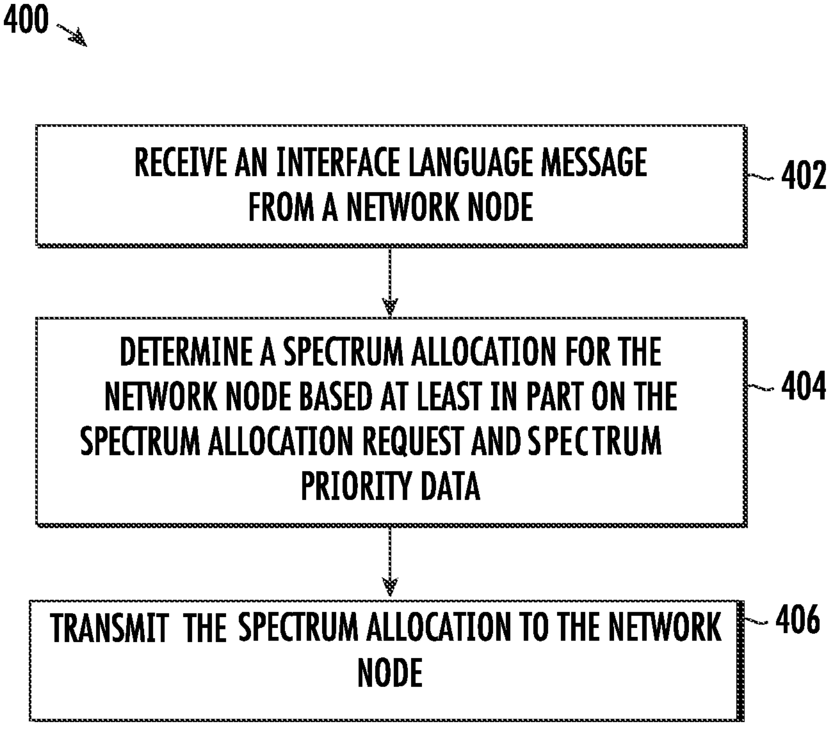
FIG. 4 illustrates a flowchart of an example method in accordance with one or more embodiments of the present disclosure.

Referring now to FIG. 4, a flowchart providing an example method is illustrated. In this regard, FIG. 4 illustrates operations that may be performed by the spectrum exchange 102 and/or components of the spectrum exchange 102.

As shown in block 402, the method 400 may include receiving an interface language message from a network node. As described above, in some embodiments, the one or more network nodes may include a base station. For example, the base station may be a cellular tower (e.g., a gNodeB). Additionally or alternatively, the one or more network nodes may include a virtual machine. For example, the virtual machine may be a software defined radio. Additionally or alternatively, the one or more network nodes may include a domain proxy. Additionally or alternatively, the one or more network nodes may include a Wi-Fi router. Additionally or alternatively, the one or more network nodes may be a user device. For example, the user device may be a citizens broadband radio service device (CBSD), a cellular phone, a smart phone, a communication device, a tablet computing device, a laptop computing device, a desktop computing device, a mobile computing device, any combination thereof, and/or the like. Said differently, in some embodiments, the one or more network nodes may include any device capable of transmitting and/or receiving radio frequency signals.

As described above, in some embodiments, each of the one or more network nodes may be instructed to use a frequency band and/or when in time to use the frequency band by a spectrum access coordinator (e.g., the spectrum access coordinator may be configured to allocate spectrum to the one or more network nodes). In some embodiments, the spectrum access coordinator may be configured to instruct each of the one or more network nodes to use any radio frequency band. For example, each of the one or more network nodes may be instructed to use a CBRS band and/or an ISM band.

As described above, each of the one or more network nodes may be at least one of a first priority network node, a second priority network node, or a third priority network node. In some embodiments, the spectrum access coordinator may be configured to instruct the one or more network nodes to use a frequency band and/or when in time to use the frequency band based at least in part on whether a network node in the one or more network nodes is a first priority network node, a second priority network node, or a third priority network node. In this regard, for example, a first priority network node may receive priority over a third priority network node in access to particular frequency bands and time when particular frequency bands may be used.

As described above, in some embodiments, spectrum may be shared between the one or more network nodes. Said differently, spectrum that has been allocated to one of the one or more network nodes by the spectrum access coordinator may be shared with another one of the one or more network nodes. In some embodiments, the sharing of spectrum between the one or more network nodes may be done at a more granular scale that than the scale that a spectrum access coordinator may be configured to allocate spectrum to the one or more network nodes (e.g., at more granular spectrum voxels). In this regard, for example, the sharing of spectrum between the one or more network nodes may be done at a size that is less than 10 MHz by 5 minutes. For example, spectrum may be shared between the one or more network nodes at a resource block scale.

As described above, each spectrum allocation, may be an amount of spectrum (e.g., a spectrum voxel) that is allocated to a network node of the one or more network nodes. In this regard, for example, each spectrum allocation may be associated with a spectrum allocation size (e.g., the spectrum allocation size indicating an amount of spectrum). The spectrum allocation size may be defined by a frequency (f) and/or a time (t). For example, a spectrum allocation size may be 180 kilohertz by 1 millisecond. In some embodiments, such as when the spectrum allocation is a resource block having a resource block size may include a resource block having 12 sub-carriers with each sub-carrier having a frequency band of 15 kHz and 2 time slots with each time slot having 7 orthogonal frequency-division multiplexing (OFDM) symbols. In this regard, for example, each resource block may be comprised of a plurality of resource elements with each resource element being 1 sub-carrier by 1 OFDM signal.

As described above, the interface language message may be based at least in part on one or more interface languages, such as the zylinium interface language (ZIL) and/or the collaboration interface language (CM). In some embodiments, the sharing of spectrum between the one or more network nodes may be based at least in part on an interface language message. In some embodiments, the interface language message received from a network node of the one or more network nodes may include a spectrum allocation request. The spectrum allocation request may indicate an amount of spectrum that a network node is requesting be allocated to it (e.g., from another network node in the one or more network nodes). In some embodiments, the spectrum allocation request may be a request for a particular portion of spectrum. For example, the spectrum allocation request may request 180 kHz for 1 millisecond (e.g., one resource block) from 3550 MHz to 3550.018 MHz. In some embodiments, the spectrum allocation request may be a request for spectrum that occupies a portion of a network node specified frequency band and/or for spectrum for a time period that occupies a portion of a network node specified time frame. For example, the spectrum allocation request be a request for 180 kHz in a frequency band from 3550 MHz to 3600 MHZ (e.g., the network node specified frequency band) for 1 second in the next 10 seconds (e.g., the network node specified time frame).

As shown in block 404, the method 400 may include determining a spectrum allocation for the network node based at least in part on the spectrum allocation request and spectrum priority data. As described above, in some embodiments, the spectrum allocation may indicate an amount of spectrum in the frequency band allocated to the network node of the one or more network nodes. Additionally or alternatively, the spectrum allocation may indicate a location of the spectrum in the frequency band allocated to the network node of the one or more network nodes. For example, if the frequency band is in the CBRS band, the spectrum allocation may indicate a spectrum from 3550 MHz to 3550.018 MHz.

As described above, in some embodiments, determining the spectrum allocation for a network node may be based at least in part on the spectrum allocation request. For example, if the spectrum allocation request indicates that a network node in the one or more network nodes is requesting 200 kHz for 1 second, the spectrum allocation may be 200 kHz for 1 second. As another example, if the spectrum allocation request indicates that a network node in the one or more network nodes is requesting 200 kHz in a frequency band from 1000 MHz to 1100 MHz for 1 second in the next 10 seconds, the spectrum allocation may be 200 kHz somewhere in the frequency band from 1000 MHz to 1100 MHz for 1 second sometime in the next 10 seconds.

As described above, in some embodiments, the spectrum priority data may include latency data. Additionally or alternatively, the spectrum priority data may include traffic priority data. For example, the traffic priority data may indicate the priority of the traffic a network node is transmitting and/or receiving. Additionally or alternatively, the spectrum priority data may include modulation coding scheme data. For example, the modulation coding scheme data may indicate how many useful bits can be transmitted per resource element.

Additionally or alternatively, the spectrum priority data may include network node position data. For example, the network node position data may indicate a location of a network node of the one or more network nodes in a network (e.g., position in the environment 100) and/or a geographic location associated with a network node in the one or more network nodes. Additionally or alternatively, the spectrum priority data may include propagation model data. For example, the propagation model data may indicate a propagation model used by a network node in the one or more network nodes. In some embodiments, the propagation model used by a network node in the one or more network nodes may be based on a geographic location of the network node (e.g., is the geographic location a mountains location, a flat location, etc.) and/or whether the network node is located indoors (e.g., an indoor Wi-Fi router) or outdoors (e.g., an outdoor cellular tower).

Additionally or alternatively the spectrum priority data may include token data. For example, the token data may indicate whether a network node is using one or more spectrum tokens. In this regard, for example, spectrum tokens may be a currency proxy purchased by a network node to increase the network node's priority in receiving spectrum (e.g., by using spectrum tokens a network node is more likely to receive the amount of spectrum requested by the network node in a spectrum allocation request). Additionally or alternatively, the spectrum priority data may include spectrum allocation size data. For example, the spectrum allocation size data may indicate a standard size of a frequency band used by a network node in the one or more network nodes.

Additionally or alternatively, the spectrum priority data may include radiation data. For example, the radiation data may indicate a radiation pattern associated with a network node of the one or more network nodes (e.g., radiation pattern of an antenna associated with a network node). Additionally or alternatively, the spectrum priority data may include transmitter data. For example, the transmitter data may indicate a transmitter height and/or a transmitter motion trajectory associated with a network node of the one or more network nodes. Additionally or alternatively, the spectrum priority data may include sensing data. For example, the sensing data may indicate whether there is energy in a particular frequency band (e.g., energy in a particular frequency band may indicate that the frequency band is already in use). Additionally or alternatively, the spectrum priority data may include other spectrum allocation data. For example, the other spectrum allocation data may indicate spectrum that has been allocated to other network nodes in the one or more network nodes (e.g., network nodes that are not associated with the current spectrum allocation request being processed).

As shown in block 406, the method 400 may include transmitting the spectrum allocation to the network node. As described above, in this regard, for example, an indication of the amount of spectrum in the frequency band allocated to the network node of the one or more network nodes may be transmitted to the network node. Additionally or alternatively, for example, an indication of the location of the spectrum in the frequency band allocated to the network node of the one or more network nodes may be transmitted to the network node.

Example Spectrum Exchange

Figure 5:
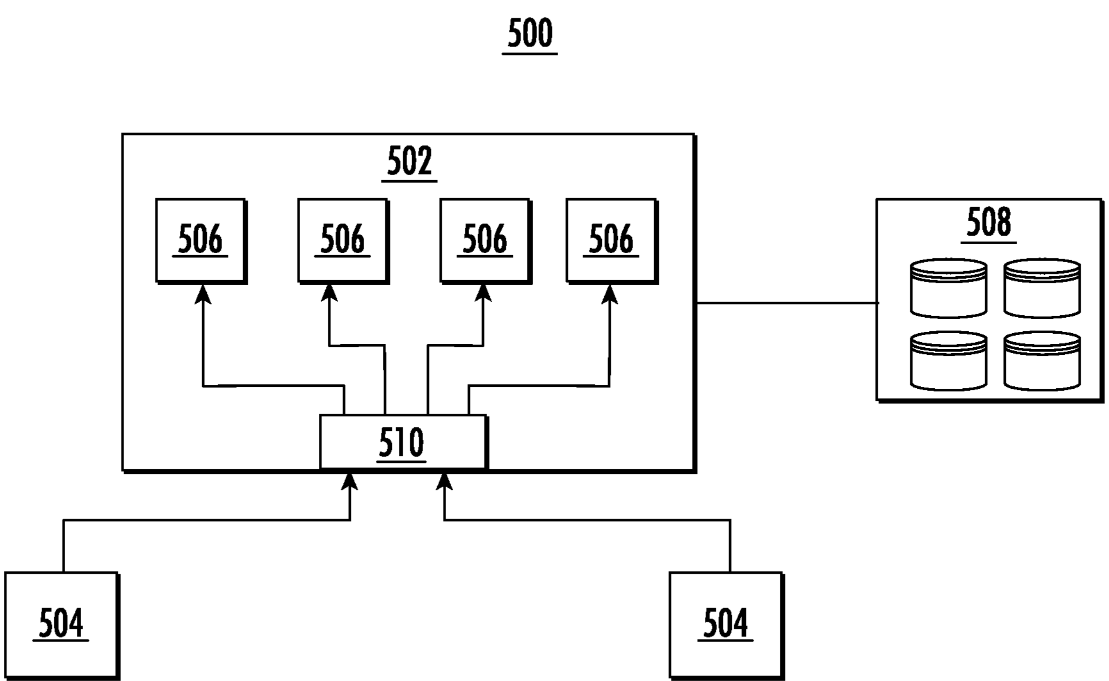
FIG. 5 illustrates an environment in which one or more embodiments of the present disclosure may operate.
Figure 6:
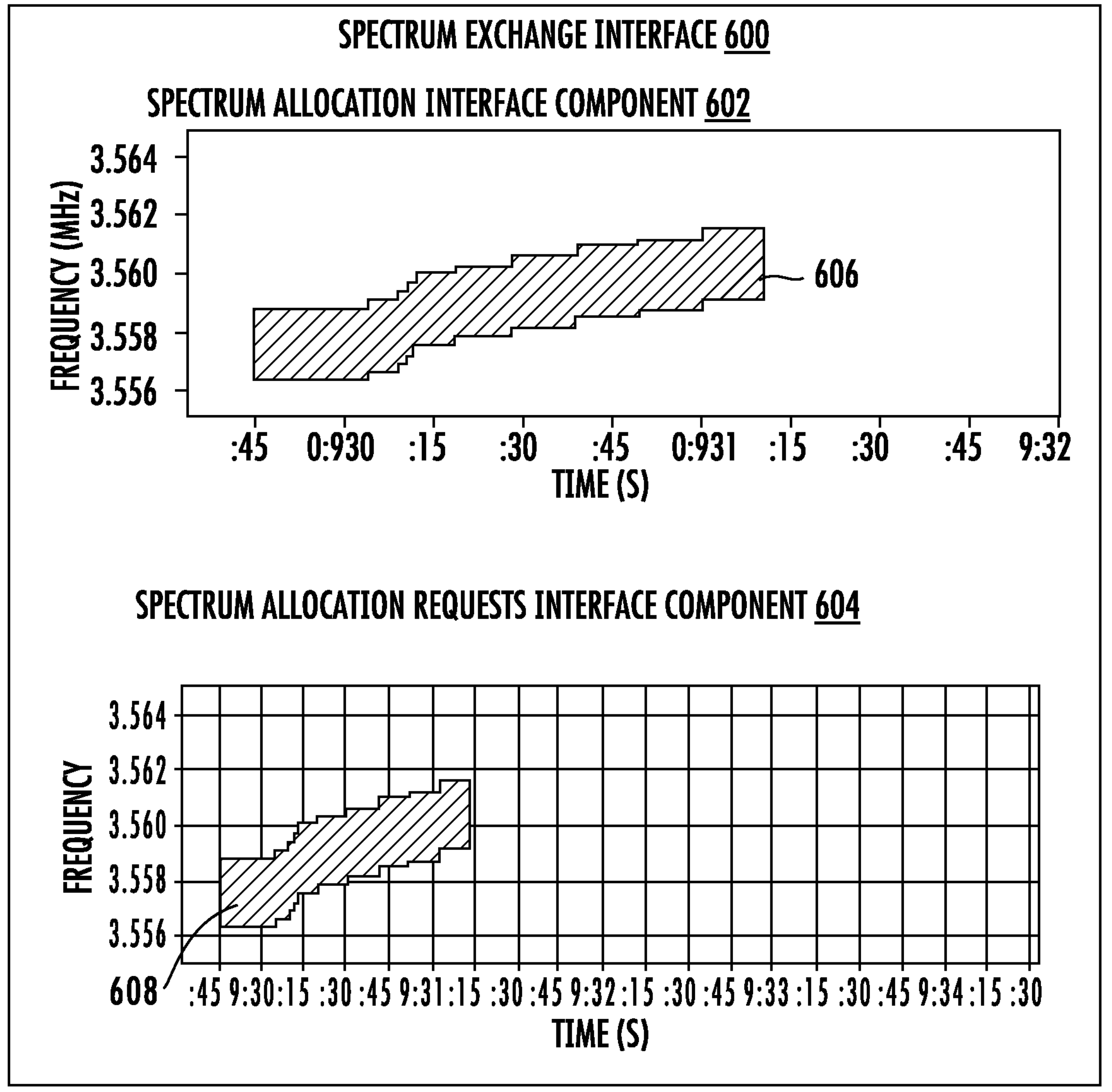
FIG. 6 illustrates a user interface in accordance with one or more embodiments of the present disclosure.

With reference to FIGS. 5-6, embodiments herein provide for an example spectrum exchange. FIG. 5 illustrates an exemplary block diagram of an environment 500 in which embodiments of the present disclosure may operate. Specifically, FIG. 1 illustrates a spectrum exchange 502. In some embodiments, the spectrum exchange 502 may be configured to facilitate sharing of radio frequency spectrum, such as spectrum associated with 5G, long term evolution (LTE), Wi-Fi, Bluetooth, and/or the like.

In some embodiments, the environment 500 may include one or more radio gateways 504 in communication with the spectrum exchange 502. In some embodiments, the one or more radio gateways 504 may be a base station (e.g., a gNodeB). For example, the base station may be a cellular tower. Additionally or alternatively, the one or more radio gateways 504 may be a virtual machine. For example, the virtual machine may be a software defined radio. Additionally or alternatively, the one or more radio gateways 504 may be a domain proxy. Additionally or alternatively, the one or more radio gateways 504 may be a Wi-Fi router. Additionally or alternatively, the one or more radio gateways 504 may be a user device. For example, the user device may be a citizens broadband radio service device (CBSD), a cellular phone, a smart phone, a communication device, a tablet computing device, laptop computing device, desktop computing device, mobile computing device, any combination thereof, and/or the like. Said differently, in some embodiments, the one or more radio gateways 504 may include any device capable of transmitting and/or receiving radio frequency signals.

In some embodiments, the one or more radio gateways 504 may be allocated (e.g., use) a frequency band for a particular amount of time for transmitting and/or receiving radio frequency signals (e.g., the one or more radio gateways 504 may be allocated (e.g., use) spectrum).). In some embodiments, for example, the one or more radio gateways 504 may be allocated any radio frequency band, such as frequency bands associated with 5G, long term evolution (LTE), Wi-Fi, Bluetooth, and/or the like. For example, the one or more radio gateways 504 may use a frequency band in the citizens broadband radio service (CBRS) band (e.g., the CBRS band from 3550 Megahertz (MHz) to 3700 MHz) for a particular amount of time. For example, the one or more radio gateways 504 may use to use a 10 MHz frequency band in the CBRS band (e.g., 3550 Megahertz (MHz) to 3560 MHz) for 10 minutes. As another example, the one or more radio gateways 504 may use a frequency band in one of the industrial, scientific, and medical (ISM) bands, such as the 2.4 Gigahertz (GHz) ISM band for a particular amount of time. For example, the one or more radio gateways 504 may use a 5 MHz frequency band in the 2.4 GHz ISM band for 10 minutes.

In some embodiments, the spectrum exchange 502 may facilitate the sharing of spectrum between the one or more radio gateways 504 in communication with the spectrum exchange 502. Said differently, the spectrum exchange 502 may be configured to facilitate the sharing of spectrum that has been allocated to one of the one or more radio gateways 504 with another one of the one or more radio gateways 504. For example, if a first radio gateway and a second radio gateway of the one or more radio gateways 504 have each been allocated a 10 MHz frequency band in the CBRS band (e.g., 3550 Megahertz (MHz) to 3560 MHz and 3560 Megahertz (MHz) to 3570 MHz, respectively) for 10 minutes, the spectrum exchange 502 may be configured to facilitate the second radio gateway sharing a portion of its allocated 10 MHz frequency band with the first radio gateway of the one or more radio gateways 504 for a particular amount of time. For example, the spectrum exchange 502 may be configured to facilitate the second radio gateway sharing 100 kHz for 30 seconds.

In some embodiments, the spectrum exchange 502 may be implemented through a spectrum exchange protocol (SEP) enabled version of a software-defined 3$^{rd}$ generation partnership project (3GPP) stack. For example, the spectrum exchange 502 may be implemented through an SEP enabled version of srsRAN. In some embodiments, the spectrum exchange 502 may be implemented through an SEP enabled version of an IEEE 802.15.4 stack. In some embodiments, the spectrum exchange 502 may be implemented through an open air interface 5G stack.

In some embodiments, the spectrum exchange 502 may include a plurality of spectrum exchange instances 506. In some embodiments, each of the plurality of spectrum exchange instances 506 may be configured to facilitate the sharing of spectrum between the one or more radio gateways 504 in communication with the spectrum exchange 502. Said differently, each of the plurality of spectrum exchange instances 506 may be configured to operate in parallel with each other to facilitate the sharing of spectrum between the one or more radio gateways 504 (e.g., the spectrum exchange 502 is containerized). In some embodiments, the plurality of spectrum exchange instances 506 may be embodied as an individual computing device. In some embodiments, the plurality of spectrum exchange instances 506 may be embodied as a distributed computing device (e.g., a distributed container architecture, such as VMWare, vSphere, and/or Kubernetes).

In some embodiments, the spectrum exchange 502 may be configured to receive a spectrum allocation request from one or more radio gateways 504 in communication with the spectrum exchange 502. In this regard, for example, a spectrum allocation request may include a request by a radio gateway to use spectrum that has been allocated to another radio gateway of the one or more radio gateways 504. In some embodiments, the spectrum allocation request may be a request for a particular portion of spectrum. For example, the spectrum allocation request may request 180 kHz for 1 millisecond from 3550 MHz to 3550.018 MHz. In some embodiments, the spectrum allocation request may be a request for a portion of spectrum in a radio gateway specified frequency band and/or for a portion of spectrum for a time period within a radio gateway specified time frame. For example, the spectrum allocation request be a request for 180 kHz in a frequency band from 3550 MHz to 3600 MHZ (e.g., the radio gateway specified frequency band) for 1 second in the next 10 seconds (e.g., the radio gateway specified time frame). In some embodiments, the one or more radio gateways 504 may be configured to transmit a spectrum allocation request to the spectrum exchange 502 over hypertext transfer protocol secure (HTTP(S)) using a RESTful interface. In some embodiments, the spectrum exchange 502 may be configured to receive a spectrum allocation request from the one or more radio gateways 504 via a load engine 510

In some embodiments, the spectrum exchange 502 may be configured to route the spectrum allocation request to one of the spectrum exchange instances of the plurality of spectrum exchange instances 506. In some embodiments, routing the spectrum allocation request to a spectrum exchange instance of the plurality of spectrum exchange instances 506 may be performed by the load engine 510.

In some embodiments, the load engine 510 may route a spectrum allocation request to a spectrum exchange instance of the plurality of spectrum exchange instances 506 based at least in part on a workload associated with each spectrum exchange instance (e.g., how many spectrum allocation requests a particular spectrum exchange is processing). For example, if a first spectrum exchange instance is currently processing 5 spectrum allocation requests and a second spectrum exchange instance is currently processing 2 spectrum allocation requests, the load engine 510 may route the received spectrum allocation request to the second spectrum exchange instance (e.g., because the first spectrum exchange instance has a greater workload than the second spectrum exchange instance).

In some embodiments, the load engine 510 may route a spectrum allocation request to a spectrum exchange instance of the plurality of spectrum exchange instances 506 based at least in part on a determination that at least one of the plurality of spectrum exchange instances 506 are affected by a fault. In this regard, for example, the spectrum exchange 502 may determine that a first spectrum exchange instance in the plurality of spectrum exchange instances 506 is affected by a fault. For example, the spectrum exchange 502 may determine that the first spectrum exchange instance of the plurality of spectrum exchange instances 506 is offline (e.g., disconnected from the load engine 510). In some embodiments, based at least in on the determination that the first spectrum exchange instance of the plurality of spectrum exchange instances 506 is affected by a fault, the spectrum exchange (e.g., via the load engine 510) may route a subsequent spectrum allocation request (e.g., a second spectrum allocation request) to a second spectrum exchange instance of the plurality of spectrum exchange instances 506.

In some embodiments, each of the plurality of spectrum exchange instances 506 may be configured to allocate spectrum among the one or more radio gateways 504 using a SEP. In this regard, for example, each of the plurality of spectrum exchange instances 506 may be configured to determine a spectrum allocation for a radio gateway of the one or more radio gateways 504 (e.g., a radio gateway that sent a spectrum allocation request). In some embodiments, the determination of spectrum allocation for a radio gateway of the one or more radio gateways 504 may be based at least in part on a spectrum allocation request. For example, if a spectrum allocation request includes a request to use 100 kHz for 30 seconds, a spectrum exchange instance of the plurality of spectrum exchange instances may be configured to determine a spectrum allocation of 100 kHz for 30 seconds.

In some embodiments, the spectrum exchange 502 may be configured to transmit the spectrum allocation request and/or the spectrum allocation to a blockchain 508. In this regard, for example, the spectrum exchange 502 may be configured to transmit the spectrum allocation request and/or the spectrum allocation to the blockchain 508 for storage. Said differently, in some embodiments, the spectrum exchange 502 may be configured to write the spectrum allocation request and/or the spectrum allocation to the blockchain 508 for storage. In some embodiments, the blockchain 508 may be an Ethereum Virtual Machine based blockchain. In some embodiments, the Ethereum Virtual Machine based blockchain may be an Ethereum Virtual Machine based blockchain may be a public Ethereum Virtual Machine based blockchain (e.g., accessible to the general public). In some embodiments, the Ethereum Virtual Machine based blockchain may be a private Ethereum Virtual Machine based blockchain (e.g., only accessible to an operator of the spectrum exchange 502 and/or the one or more radio gateways 504).

In some embodiments, the spectrum exchange 502 may be configured to access the spectrum allocation request and/or the spectrum allocation from the blockchain 508. For example, the spectrum exchange 502 may be configured to access all previous spectrum allocation requests and/or the spectrum allocations that have previously been stored in the blockchain 508. In some embodiments, the spectrum exchange 502 may be configured to access a spectrum allocation request and/or a spectrum allocation from the blockchain 508 when one or more of the one or more spectrum exchange instances 506 are affected by a fault (e.g., a spectrum allocation request and/or a spectrum allocation associated with a spectrum exchange instance that is affected by a fault). In this regard, the spectrum exchange 502 is configured to access previous spectrum allocation requests and/or previous spectrum allocations (e.g., from the blockchain 508) even when the spectrum exchange cannot access previous spectrum allocation requests and/or previous spectrum allocations from a spectrum exchange instance that is affected by a fault (e.g., when a spectrum exchange instance is offline).

In some embodiments, the spectrum exchange 502 may be configured to cause spectrum allocation requests and/or spectrum allocations to be displayed on a user interface. For example, the spectrum exchange 502 may be configured to cause spectrum allocations to be displayed on a spectrum exchange interface 600. In this regard, for example, the spectrum exchange interface 600 may include a spectrum allocation interface component 602 configured to display a spectrum allocation graphic 606. The spectrum allocation graphic 606 may display, for example, spectrum that has been allocated (e.g., the spectrum allocation graphic 606 may display frequency bands that have been allocated and for how long the frequency bands have been allocated). As another example, the spectrum exchange 502 may be configured to cause spectrum allocation requests to be displayed on the spectrum exchange interface 600. In this regard, for example, the spectrum exchange interface 600 may include a spectrum allocation requests interface component 604 configured to display a spectrum allocation requests graphic 608. The spectrum allocation requests graphic 608 may display, for example, spectrum that has been requested (e.g., the spectrum allocation requests graphic 608 may display frequency bands that have been requested and for how long the frequency bands have been requested).

In some embodiments, the spectrum exchange 502 may be configured to perform a security scan on at least one of the plurality of spectrum exchange instances 506. In some embodiments, the spectrum exchange 502 may be configured to perform a security scan on a spectrum exchange instance before routing a spectrum allocation request to the spectrum exchange instance. In this regard, by passing a security scan a spectrum exchange instance may be given an authority to operate (e.g., authority to determine spectrum allocations).

Example Method

Figure 7:
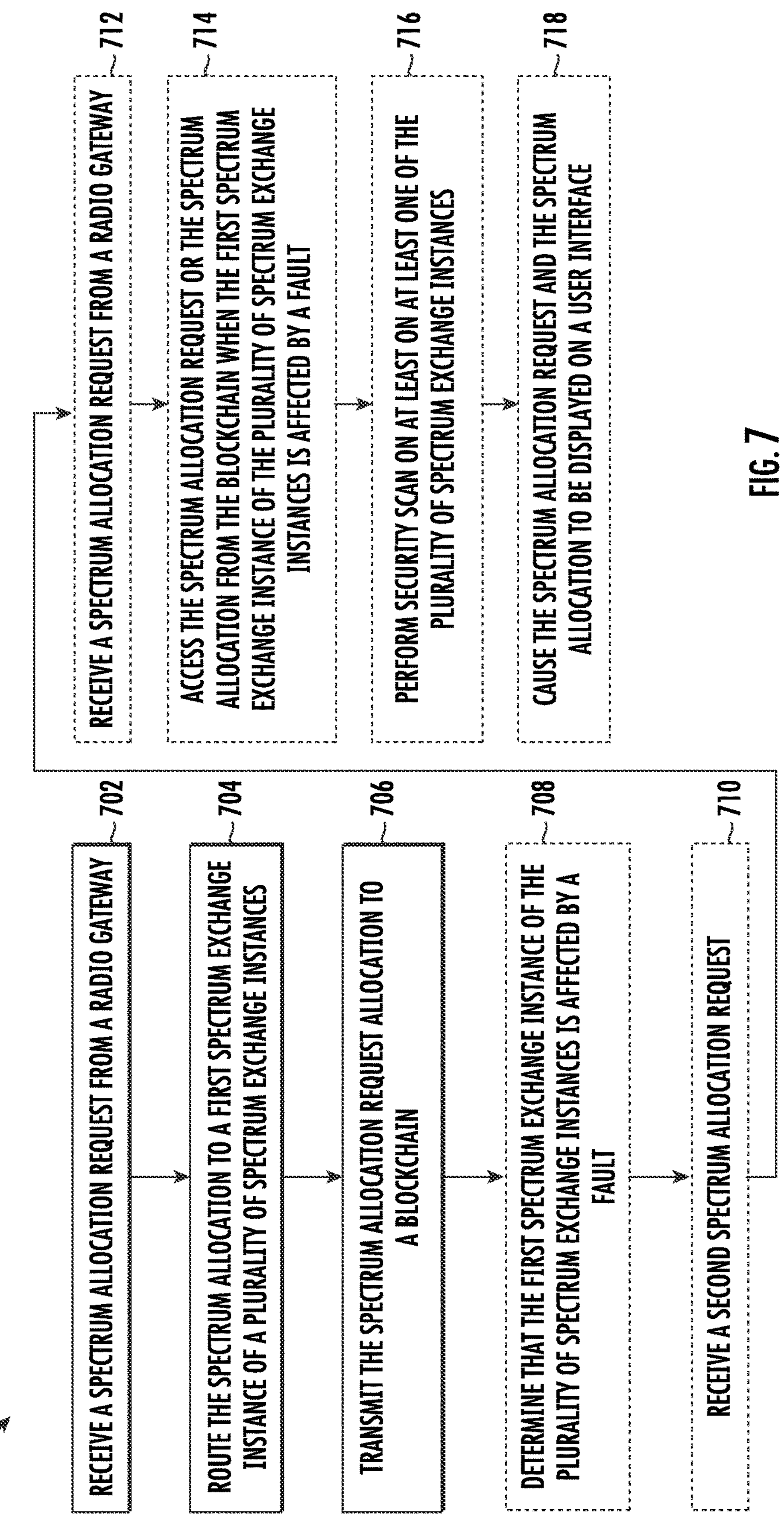
FIG. 7 illustrates a flowchart of an example method in accordance with one or more embodiments of the present disclosure.

Referring now to FIG. 7, a flowchart providing an example method 700 is illustrated. In this regard, FIG. 7 illustrates operations that may be performed by the spectrum exchange 502 and/or components of the spectrum exchange 502.

As shown in block 702, the method 700 may include receiving a spectrum allocation request from a radio gateway. As described above, in some embodiments, the one or more radio gateways may be a base station (e.g., a gNodeB). For example, the base station may be a cellular tower. Additionally or alternatively, the one or more radio gateways may be a virtual machine. For example, the virtual machine may be a software defined radio. Additionally or alternatively, the one or more radio gateways may be a domain proxy. Additionally or alternatively, the one or more radio gateways may be a Wi-Fi router. Additionally or alternatively, the one or more radio gateways may be a user device. For example, the user device may be a citizens broadband radio service device (CBSD), a cellular phone, a smart phone, a communication device, a tablet computing device, laptop computing device, desktop computing device, mobile computing device, any combination thereof, and/or the like. Said differently, in some embodiments, the one or more radio gateways may include any device capable of transmitting and/or receiving radio frequency signals.

As described above, in some embodiments, the one or more radio gateways may be allocated (e.g., use) a frequency band for a particular amount of time for transmitting and/or receiving radio frequency signals (e.g., the one or more radio gateways may be allocated (e.g., use) spectrum). In this regard, the one or more radio gateways may be allocated frequency bands associated with 5G, long term evolution (LTE), Wi-Fi, Bluetooth, and/or the like. For example, the one or more radio gateways may use a frequency band in the citizens broadband radio service (CBRS) band (e.g., the CBRS band from 3550 Megahertz (MHz) to 3700 MHz) for a particular amount of time. For example, the one or more radio gateways may use to use a 10 MHz frequency band in the CBRS band (e.g., 3550 Megahertz (MHz) to 3560 MHz) for 10 minutes. As another example, the one or more radio gateways may use a frequency band in one of the industrial, scientific, and medical (ISM) bands, such as the 2.4 Gigahertz (GHz) ISM band for a particular amount of time. For example, the one or more radio gateways may use a 5 MHz frequency band in the 2.4 GHz ISM band for 10 minutes.

As described above, in some embodiments, spectrum may be shared between one or more radio gateways. Said differently, spectrum may be shared that has been allocated to one of the one or more radio gateways with another one of the one or more radio gateways, such as an CBRS band and/or an ISM band.

As described above, in this regard, for example, a spectrum allocation request may include a request by a radio gateway to use spectrum that has been allocated to another radio gateway of the one or more radio gateways. In some embodiments, the spectrum allocation request may be a request for a particular portion of spectrum. For example, the spectrum allocation request may request 180 kHz for 1 millisecond from 3550 MHz to 3550.018 MHz. In some embodiments, the spectrum allocation request may be a request for a portion of spectrum in a radio gateway specified frequency band and/or for a portion of spectrum for a time period within a radio gateway specified time frame. For example, the spectrum allocation request be a request for 180 kHz in a frequency band from 3550 MHz to 3600 MHZ (e.g., the radio gateway specified frequency band) for 1 second in the next 10 seconds (e.g., the radio gateway specified time frame).

As shown in block 704, the method 700 may include routing the spectrum allocation request to a first spectrum exchange instance of a plurality of spectrum exchange instances. As described above, in some embodiments, the load engine may route a spectrum allocation request to a spectrum exchange instance of the plurality of spectrum exchange instances based at least in part on a workload associated with each spectrum exchange instance (e.g., how many spectrum allocation requests a particular spectrum exchange is processing). For example, if a first spectrum exchange instance is currently processing 5 spectrum allocation requests and a second spectrum exchange instance is currently processing 2 spectrum allocation requests, the load engine may route the received spectrum allocation request to the second spectrum exchange instance (e.g., because the first spectrum exchange instance has a greater workload than the second spectrum exchange instance).

As described above, in some embodiments, each of the plurality of spectrum exchange instances may be configured to allocate spectrum among the one or more radio gateways using a SEP. In this regard, for example, each of the plurality of spectrum exchange instances may be configured to determine a spectrum allocation for a radio gateway of the one or more radio gateways (e.g., a radio gateway that sent a spectrum allocation request). In some embodiments, the determination of spectrum allocation for a radio gateway of the one or more radio gateways may be based at least in part on a spectrum allocation request. For example, if a spectrum allocation request includes a request to use 100 kHz for 30 seconds, a spectrum exchange instance of the plurality of spectrum exchange instances may be configured to determine a spectrum allocation of 100 kHz for 30 seconds.

As shown in block 706, the method 700 may include transmitting the spectrum allocation request and the spectrum allocation to a blockchain. As described above, in this regard, for example, the spectrum allocation request and/or the spectrum allocation may be transmitted to the blockchain for storage. In some embodiments, the blockchain may be an Ethereum Virtual Machine based blockchain. In some embodiments, the Ethereum Virtual Machine based blockchain may be an Ethereum Virtual Machine based blockchain may be a public Ethereum Virtual Machine based blockchain (e.g., accessible to the general public). In some embodiments, the Ethereum Virtual Machine based blockchain may be a private Ethereum Virtual Machine based blockchain.

As shown in block 708, the method 700 may include determining that the first spectrum exchange instance of the plurality of spectrum exchange instances is affected by a fault. As described above, in some embodiments, the load engine may route a spectrum allocation request to a spectrum exchange instance of the plurality of spectrum exchange instances based at least in part on a determination that at least one of the plurality of spectrum exchange instances are affected by a fault. For example, a first spectrum exchange instance of the plurality of spectrum exchange instances may be affected by a fault when it is offline (e.g., disconnected from the load engine).

As shown in block 710, the method 700 may include receiving a second spectrum allocation request. As shown in block 712, the method 700 may include routing the second spectrum allocation request to a second spectrum exchange instance of a plurality of spectrum exchange instances based at least in part on the determination that the first spectrum exchange instance of the plurality of spectrum exchange instances is affected by the fault.

As shown in block 714, the method 700 may include accessing the spectrum allocation request or the spectrum allocation from the blockchain when the first spectrum exchange instance of the plurality of spectrum exchange instances is affected by a fault. As described above, in some embodiments, for example, all previous spectrum allocation requests and/or the spectrum allocations that have previously been stored in the blockchain may be accessed. In some embodiments, a spectrum allocation request and/or a spectrum allocation may be accessed from the blockchain when one or more of the one or more spectrum exchange instances are affected by a fault (e.g., a spectrum allocation request and/or a spectrum allocation associated with a spectrum exchange instance that is affected by a fault). In this regard, previous spectrum allocation requests and/or previous spectrum allocations (e.g., from the blockchain) may be accessed even when the previous spectrum allocation requests and/or previous spectrum allocations cannot be accessed from a spectrum exchange instance that is affected by a fault (e.g., when a spectrum exchange instance is offline).

As shown in block 716, the method 700 may include performing security scan on at least on at least one of the plurality of spectrum exchange instances. As described above, in some embodiments, a security scan may be performed on a spectrum exchange instance before routing a spectrum allocation request to the spectrum exchange instance. In this regard, by passing a security scan a spectrum exchange instance may be given an authority to operate (e.g., authority to determine spectrum allocations).

As shown in block 718, the method 700 may include causing the spectrum allocation request and the spectrum allocation to be displayed on a user interface. As described above, for example, spectrum allocations may be caused to be displayed on a spectrum exchange interface. In this regard, for example, the spectrum exchange interface may include a spectrum allocation interface component configured to display a spectrum allocation graphic. The spectrum allocation graphic may display, for example, spectrum that has been allocated (e.g., the spectrum allocation graphic may display frequency bands that have been allocated and for how long the frequency bands have been allocated). As another example, spectrum allocation requests may be caused to be displayed on the spectrum exchange interface. In this regard, for example, the spectrum exchange interface may include a spectrum allocation requests interface component configured to display a spectrum allocation requests graphic. The spectrum allocation requests graphic may display, for example, spectrum that has been requested (e.g., the spectrum allocation requests graphic may display frequency bands that have been requested and for how long the frequency bands have been requested).

Example Computer Processing Device

Figure 8:
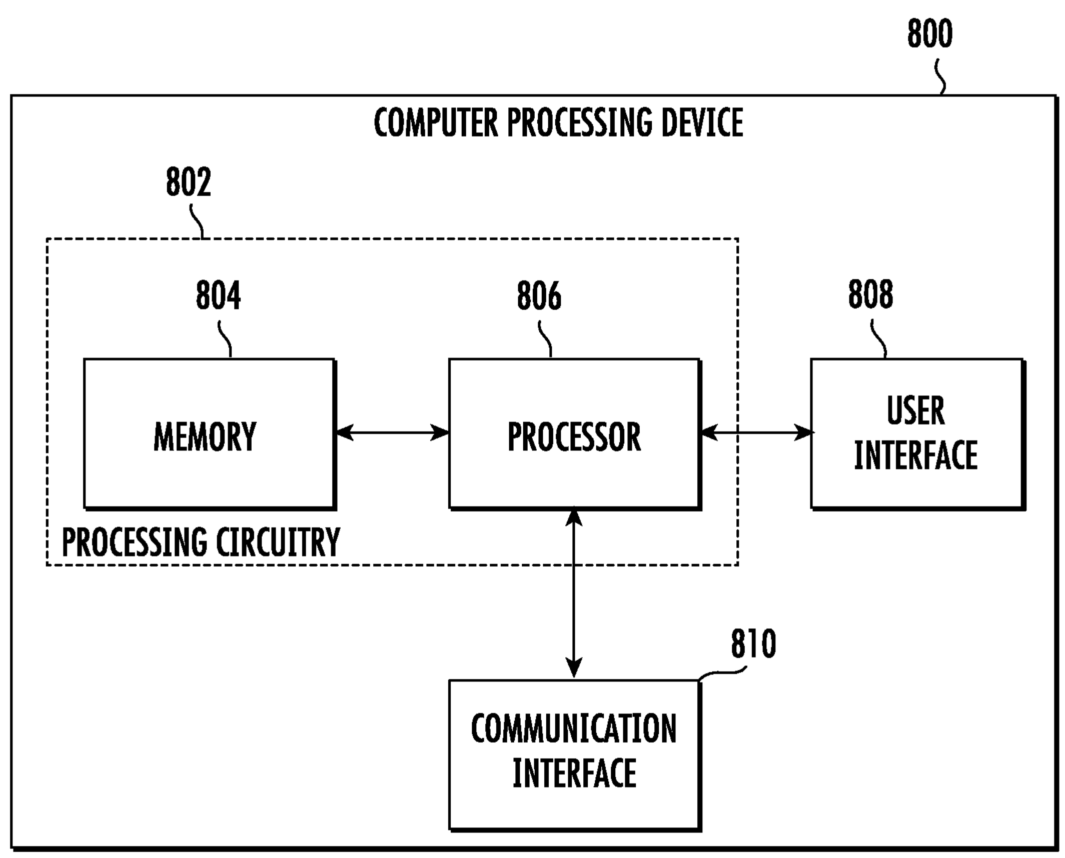
FIG. 8 illustrates a block diagram of an example computer processing device in accordance with one or more embodiments of the present disclosure.

With reference to FIG. 8, a block diagram of an example computer processing device 800 is illustrated in accordance with some example embodiments. In some embodiments, the spectrum exchange 102, the one or more network nodes 104, the spectrum access coordinator 106, the one or more user devices 108, spectrum exchange 502, the one or more radio gateways 504, the plurality of spectrum exchange instances 506, the blockchain 508, and/or other devices may be embodied as one or more computer processing devices, such as the computer processing device 800 in FIG. 8. However, it should be noted that the components, devices, or elements illustrated in and described with respect to FIG. 8 below may not be mandatory and thus one or more may be omitted in certain embodiments. Additionally, some embodiments may include further or different components, devices or elements beyond those illustrated in and described with respect to FIG. 8.

The computer processing device 800 may include or otherwise be in communication with processing circuitry 802 that is configurable to perform actions in accordance with one or more embodiments disclosed herein. In this regard, the processing circuitry 802 may be configured to perform and/or control performance of one or more functionalities of the computer processing device 800 in accordance with various embodiments, and thus may provide means for performing functionalities of the computer processing device 800 in accordance with various embodiments. The processing circuitry 802 may be configured to perform data processing, application execution and/or other processing and management services according to one or more embodiments. In some embodiments, the computer processing device 800 or a portion(s) or component(s) thereof, such as the processing circuitry 802, may be embodied as or comprise a chip or chip set. In other words, the computer processing device 800 or the processing circuitry 802 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 800 or the processing circuitry 802 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 802 may include a processor 806 and, in some embodiments, such as that illustrated in FIG. 8, may further include memory 804. The processing circuitry 802 may be in communication with or otherwise control a user interface 808 and/or a communication interface 810. As such, the processing circuitry 802 may be embodied as a circuit chip (e.g., an integrated circuit chip) configured (e.g., with hardware, software or a combination of hardware and software) to perform operations described herein.

The processor 806 may be embodied in a number of different ways. For example, the processor 806 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 806 may comprise a plurality of processors. The plurality of processors may be in operative communication with each other and may be collectively configured to perform one or more functionalities of the computer processing device 800 as described herein. In some embodiments, the processor 806 may be configured to execute instructions stored in the memory 804 or otherwise accessible to the processor 806. As such, whether configured by hardware or by a combination of hardware and software, the processor 806 may represent an entity (e.g., physically embodied in circuitry—in the form of processing circuitry 802) capable of performing operations according to embodiments of the present disclosure while configured accordingly. Thus, for example, when the processor 806 is embodied as an ASIC, FPGA or the like, the processor 806 may be specifically configured hardware for conducting the operations described herein. Alternatively, as another example, when the processor 806 is embodied as an executor of software instructions, the instructions may specifically configure the processor 806 to perform one or more operations described herein.

In some embodiments, the memory 804 may include one or more non-transitory memory devices such as, for example, volatile and/or non-volatile memory that may be either fixed or removable. In this regard, the memory 804 may comprise a non-transitory computer-readable storage medium. It will be appreciated that while the memory 804 is illustrated as a single memory, the memory 804 may comprise a plurality of memories. The memory 804 may be configured to store information, data, applications, instructions and/or the like for enabling the computer processing device 800 to carry out various functions in accordance with one or more embodiments. For example, the memory 804 may be configured to buffer input data for processing by the processor 806. Additionally or alternatively, the memory 804 may be configured to store instructions for execution by the processor 806. As yet another alternative, the memory 804 may include one or more databases that may store a variety of files, contents or data sets. Among the contents of the memory 804, applications may be stored for execution by the processor 806 in order to carry out the functionality associated with each respective application. In some cases, the memory 804 may be in communication with one or more of the processor 806, user interface 808, and/or communication interface 810 via a bus(es) for passing information among components of the computer processing device 800.

The user interface 808 may be in communication with the processing circuitry 802 to receive an indication of a user input at the user interface 808 and/or to provide an audible, visual, mechanical or other output to the user. As such, the user interface 808 may include, for example, a keyboard, a mouse, a joystick, a display, a touch screen display, a microphone, a speaker, and/or other input/output mechanisms. As such, the user interface 808 may, in some embodiments, may provide means for a user to access and interact with the spectrum exchange 102, the one or more network nodes 104, the spectrum access coordinator 106, the one or more user devices 108, the spectrum exchange 502, the one or more radio gateways 504, the plurality of spectrum exchange instances 506, and/or the blockchain 508.

The communication interface 810 may include one or more interface mechanisms for enabling communication with other devices and/or networks. In some cases, the communication interface 810 may be any means such as a device or circuitry embodied in either hardware, or a combination of hardware and software that is configured to receive and/or transmit data from/to a network and/or any other device or module in communication with the processing circuitry 802. By way of example, the communication interface 810 may be configured to enable spectrum exchange 102 to communicate with the one or more network nodes 104, the spectrum access coordinator 106, the one or more user devices 108, and/or other devices. As another example, the communication interface 810 may be configured to enable the spectrum exchange 502 to communicate with the one or more radio gateways 504, the plurality of spectrum exchange instances 506, the blockchain 508 and/or other devices. Accordingly, the communication interface 810 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed is:

1. A spectrum exchange comprising at least one processor and at least one memory coupled to the at least one processor, wherein the at least one processor is configured to:

receive an interface language message from a first network node, wherein the interface language message comprises a spectrum allocation request, wherein the spectrum allocation request comprises a node initiated request by the first network node to obtain at least a portion of spectrum that is currently allocated to a second network node, wherein the spectrum was previously allocated to the second network node by a spectrum access coordinator;

determine a spectrum allocation for the first network node based at least in part on the spectrum allocation request and spectrum priority data, wherein the spectrum allocation is determined in response to receiving the interface language message; and transmit the spectrum allocation to the first network node.

2. The spectrum exchange of claim 1, wherein the first network node has been instructed to use a frequency band by the spectrum access coordinator.

3. The spectrum exchange of claim 2, wherein the spectrum allocation indicates an amount of spectrum in the frequency band allocated to the first network node.

4. The spectrum exchange of claim 3, wherein the spectrum allocation is associated with a spectrum allocation size.

5. The spectrum exchange of claim 2, wherein the spectrum exchange, the spectrum access coordinator, the first network node, and the second network node are separate devices located in different geographic locations.

6. The spectrum exchange of claim 1, wherein at least a portion of the spectrum priority data is received from the first network node.

7. The spectrum exchange of claim 1, wherein the spectrum allocation request comprises a request for spectrum that occupies a portion of a network node specified frequency band.

8. The spectrum exchange of claim 1, wherein the first network node comprises a base station or a virtual machine.

9. The spectrum exchange of claim 8, wherein the virtual machine is a software defined radio.

10. The spectrum exchange of claim 1, wherein the spectrum priority data comprises one or more of latency data, network node priority data, modulation coding scheme data, network node position data, propagation model data, token data, spectrum allocation size data, radiation data, transmitter data, sensing data, or other spectrum allocation data.

11. The spectrum exchange of claim 1, wherein the first network node is configured to allocate at least a portion of the spectrum allocation to a user device associated with the first network node.

12. The spectrum exchange of claim 1, wherein the first network node is at least one of a first priority network node, a second priority network node, or a third priority network node.

13. The spectrum exchange of claim 1, wherein the spectrum allocation request further comprises a second request by the first network node to use the spectrum that is currently allocated to the second network node for a time period that occupies a portion of a network node specified time frame.

14. The spectrum exchange of claim 1, wherein determining the spectrum allocation is performed independently of the spectrum access coordinator.

15. The spectrum exchange of claim 1, wherein the spectrum allocation comprises a spectrum-time voxel having a frequency-time size smaller than a minimum allocation size of the spectrum access coordinator.

16. The spectrum exchange of claim 1, wherein the first network node receives an initial spectrum allocation from the spectrum access coordinator prior to receiving the spectrum allocation from the spectrum exchange.

17. A computer-implemented method comprising:

receiving an interface language message from a first network node, wherein the interface language message comprises a spectrum allocation request, wherein the spectrum allocation request comprises a node initiated request by the first network node to obtain at least a portion of spectrum that is currently allocated to a second network node, wherein the spectrum was previously allocated to the second network node by a spectrum access coordinator;

determining a spectrum allocation for the first network node based at least in part on the spectrum allocation request and spectrum priority data, wherein the spectrum allocation is determined in response to receiving the interface language message; and transmitting the spectrum allocation to the first network node.

18. The computer-implemented method of claim 17, wherein the first network node has been instructed to use a frequency band by the spectrum access coordinator.

19. The computer-implemented method of claim 18, wherein the spectrum allocation indicates an amount of spectrum in the frequency band allocated to the first network node.

20. A non-transitory computer-readable storage medium comprising computer program code for execution by one or more processors of a device, the computer program code configured to, when executed by the one or more processors, cause the device to:

receive an interface language message from a first network node, wherein the interface language message comprises a spectrum allocation request, wherein the spectrum allocation request comprises a node initiated request by the first network node to obtain at least a portion of spectrum that is currently allocated to a second network node, wherein the spectrum was previously allocated to the second network node by a spectrum access coordinator;

determine a spectrum allocation for the first network node based at least in part on the spectrum allocation request and spectrum priority data, wherein the spectrum allocation is determined in response to receiving the interface language message; and transmit the spectrum allocation to the first network node.

* * * * *